(12) United States Patent
Davis et al.

(10) Patent No.: US 11,779,518 B2
(45) Date of Patent: Oct. 10, 2023

(54) BLISTER PACK DEVICE AND METHOD

(71) Applicant: Express Scripts Strategic Development, Inc., St. Louis, MO (US)

(72) Inventors: Michael L. Davis, Edwardsville, IL (US); Kenneth G. Coulter, Columbia, IL (US); David C. Trice, Chadds Ford, PA (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 0 days.

(21) Appl. No.: 17/396,833

(22) Filed: Aug. 9, 2021

(65) Prior Publication Data
US 2023/0043100 A1    Feb. 9, 2023

(51) Int. Cl.
  *B65B 9/04* (2006.01)
  *B65B 11/52* (2006.01)
  *A61J 1/03* (2023.01)
  *B65D 75/36* (2006.01)
  *B65D 75/32* (2006.01)
  *B65B 5/02* (2006.01)

(52) U.S. Cl.
  CPC ............... *A61J 1/035* (2013.01); *B65B 5/02* (2013.01); *B65B 9/045* (2013.01); *B65D 75/327* (2013.01); *B65D 75/367* (2013.01); *B65B 11/52* (2013.01)

(58) Field of Classification Search
  None
  See application file for complete search history.

(56) References Cited

U.S. PATENT DOCUMENTS

| | | | |
|---|---|---|---|
| 2,943,428 A * | 7/1960 | Stroop | B65B 9/045 53/493 |
| 5,368,187 A | 11/1994 | Poncetta | |
| 7,715,277 B2 | 5/2010 | De La Huerga | |
| 7,779,614 B1 | 8/2010 | McGonagle | |
| 7,866,476 B2 | 1/2011 | McGonagle | |
| 7,937,911 B1 | 5/2011 | Mcgonagle | |
| 7,987,985 B2 | 8/2011 | Ede | |
| 8,065,035 B2 | 11/2011 | Ross | |
| 8,074,426 B2 | 12/2011 | Luciano, Jr. | |
| 8,266,878 B2 | 9/2012 | Luciano, Jr. | |
| 8,712,582 B1 | 4/2014 | Luciano, Jr. | |
| 8,720,659 B2 | 5/2014 | Pawley | |

(Continued)

FOREIGN PATENT DOCUMENTS

| | | |
|---|---|---|
| WO | 2008000790 A1 | 1/2008 |
| WO | 2014108399 A1 | 7/2014 |

OTHER PUBLICATIONS

Cardinal Health, Dispill Medication Packaging System, accessed as early as Feb. 14, 2022.

*Primary Examiner* — Tanzim Imam
(74) *Attorney, Agent, or Firm* — Dickinson Wright PLLC

(57) ABSTRACT

A container forming apparatus includes a plurality of forming members that have outer forming surfaces, which are shaped to form pockets in a sheet of material. A plurality of actuators are in mechanical connection with the forming members. The actuators are able to extend and retract the forming members. A controller is in electrical communication with the plurality of actuators. The controller is able to simultaneously extend any one or any combination of the forming members to create a plurality of pockets in a determined pattern in the sheet of material to produce a customized blister pack.

17 Claims, 11 Drawing Sheets

(56) References Cited

U.S. PATENT DOCUMENTS

| | | |
|---|---|---|
| 8,777,012 B2 | 7/2014 | Luciano, Jr. |
| 8,914,298 B1 | 12/2014 | Luciano |
| 8,925,726 B2 | 1/2015 | Bergey |
| 8,931,241 B2 | 1/2015 | Luciano, Jr. |
| 9,015,058 B2 | 4/2015 | Luciano, Jr. |
| 9,075,576 B2 | 7/2015 | Chen |
| 9,188,170 B2 | 11/2015 | Prout |
| 9,557,375 B2 | 1/2017 | Kabbani |
| 9,710,866 B2 | 7/2017 | Luciano, Jr. |
| 10,207,269 B2 | 2/2019 | Ismagilov |
| 10,525,912 B2 | 1/2020 | Salter |
| 10,610,320 B2 | 4/2020 | Dachs, II |
| 10,968,964 B2 | 4/2021 | Hand |
| 11,002,929 B2 | 5/2021 | Geens |
| 11,299,346 B1 | 4/2022 | Hoffman |
| 2002/0117405 A1 | 8/2002 | Wang |
| 2006/0122729 A1 | 6/2006 | Murphy |
| 2006/0277870 A1 | 12/2006 | Feehan |
| 2007/0227099 A1 | 10/2007 | Conti |
| 2007/0265729 A1 | 11/2007 | Braun |
| 2008/0035520 A1 | 2/2008 | Caracciolo |
| 2008/0308445 A1 | 12/2008 | Dolak |
| 2009/0277815 A1 | 11/2009 | Kohl |
| 2015/0143988 A1 | 5/2015 | Rastegar |
| 2015/0321732 A1 | 11/2015 | Major |
| 2015/0353213 A1 | 12/2015 | Kohl |
| 2018/0133919 A1* | 5/2018 | Waterman ............... B65B 61/10 |
| 2020/0071086 A1 | 3/2020 | Greyshock |
| 2020/0342972 A1 | 10/2020 | Chudy |
| 2021/0261282 A1* | 8/2021 | Crivolio .................... B65B 9/04 |

\* cited by examiner

BLISTER PACK DEVICE AND METHOD

BACKGROUND

1. Field

The present disclosure is related generally to an assembly for rapidly producing blister packs and filling those blister packs with solid medications.

2. Related Art

A blister pack is a pre-formed plastic packaging commonly used to package solid medications, such as pills, gel caps, tablets, etc. Common blister packs include two components: a plastic sheet and a covering. During manufacture, the plastic sheet is deformed, such as through a thermoforming operation, to present a plurality of pockets that are shaped and sized to contain the medications. The covering may be made of, for example, a foil or plastic material, and is bonded with the plastic sheet to trap the medications within the pockets until a user is ready to extract the medications. Such blister packs are typically mass produced with identical constructions and then filled with the same types of medications. For example, for a particular application, each blister pack might contain twenty identical pills.

SUMMARY

An aspect of the present disclosure is related to a container forming apparatus. The apparatus includes a plurality of forming members that have outer forming surfaces, which are shaped to form pockets in a sheet of material. A plurality of actuators are in mechanical connection with the forming members. The actuators are able to extend and retract the forming members, selectively to form wells that can receive dry goods such as ingestible drugs or supplements. A controller is in electrical communication with the plurality of actuators. The controller is able to simultaneously extend any one or any combination of the forming members to create a plurality of pockets in a predetermined pattern in the sheet of material to produce a customized blister pack.

In an embodiment, the plurality of forming members are plungers that can move in a vertically downward direction to form pockets into the sheet of material or outwardly from the base of the apparatus.

In an embodiment, the plurality of forming members includes a plurality of forming members that are arranged in more than one row and in more than one column, and the controller can actuate any combination of the plungers simultaneously.

In an embodiment, the outer forming surfaces of some of the plurality of forming members have different shapes or different sizes for forming differently shaped or differently sized pockets into the sheet of material.

In an embodiment, the plurality of forming members are arranged on a drum that can roll along the sheet of material, and any one forming member or any combination of the forming members can simultaneously extend into and out of the drum.

Another aspect of the present disclosure is related to a blister pack manufacturing assembly. The blister pack manufacturing assembly includes a supply which includes a quantity of a sheet of material. The assembly further includes a pocket forming station with at least one pocket forming mechanism that is configured to deform the sheet of material to include a plurality of pockets. The pocket forming mechanism includes a plurality of forming members that have outer forming surfaces and a plurality of actuators. A controller is configured to activate any one or any combination of the plurality of forming members to form one or more pockets into the sheet of material. A filling station is provided and includes a quantity of pills, or other small dry objects, and is configured to insert the pills into the pockets formed into the sheet of material by the at least one pocket forming mechanism. A covering station is provided to apply a covering onto the sheet of material to trap the pills in the pockets.

In an embodiment, the sheet of material is made of plastic.

In an embodiment, the plurality of forming members are a plurality of plungers.

In an embodiment, the plurality of pocket forming members are disposed on a drum that can roll along the sheet of material, and the plurality of pocket forming members can extend out of or into the drum.

In an embodiment, the outer forming surfaces of some of the plurality of pocket forming members have different shapes or different sizes for forming differently shaped or differently sized pockets into the sheet of material.

In an embodiment, the plurality of pocket forming members are disposed on a drum that can roll along the sheet of material, and the plurality of pocket forming members are openings in fluid communication with a vacuum device that can pull the sheet of material into the openings to form the pockets.

Yet another aspect of the present disclosure is related to a medication package that includes a container. The container includes a sheet of plastic with a plurality of pockets arranged in a grid that includes a plurality of rows of pockets. At least one of the rows of pockets have a different number of pockets than at least one of the other rows of pockets. The pockets are fluidly sealed from one another.

In an embodiment, at least two of the pockets contain different types of pills.

In an embodiment, at least one of the plurality of pockets contains at least two pills of the same type.

In an embodiment, at least two of the pockets have different sizes from one another.

In an embodiment, a covering is applied to a planar top surface of the container and captures pills within the plurality of pockets.

In an embodiment, indicia is provided on at least one of the container and the covering and identifies the objects (e.g., pills or other dry goods) in the plurality of pockets.

In an embodiment, the indicia identifies the rows of pockets as being associated with doses.

In an embodiment, the indicia includes images of the pills contained in the pockets.

In an embodiment, the container is at least partially transparent or the top of bottom is translucent.

The above embodiments can be combined in any order.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DESCRIPTION OF THE ENABLING EMBODIMENT

As discussed in further detail below, the present disclosure is related to a customized multiple dry goods, e.g., medication, container that includes a customized arrangement of pockets or wells that can contain a specific arrangement of pills or other solid medications according to a patient's specific medication regimen. Such an ordered arrangement can assist in delivery of the goods in an ordered manner and in the case of medications may assist in improving adherence when a patient has a complex drug treatment regimen of multiple drugs that are taken at different time intervals.

Figure 1:
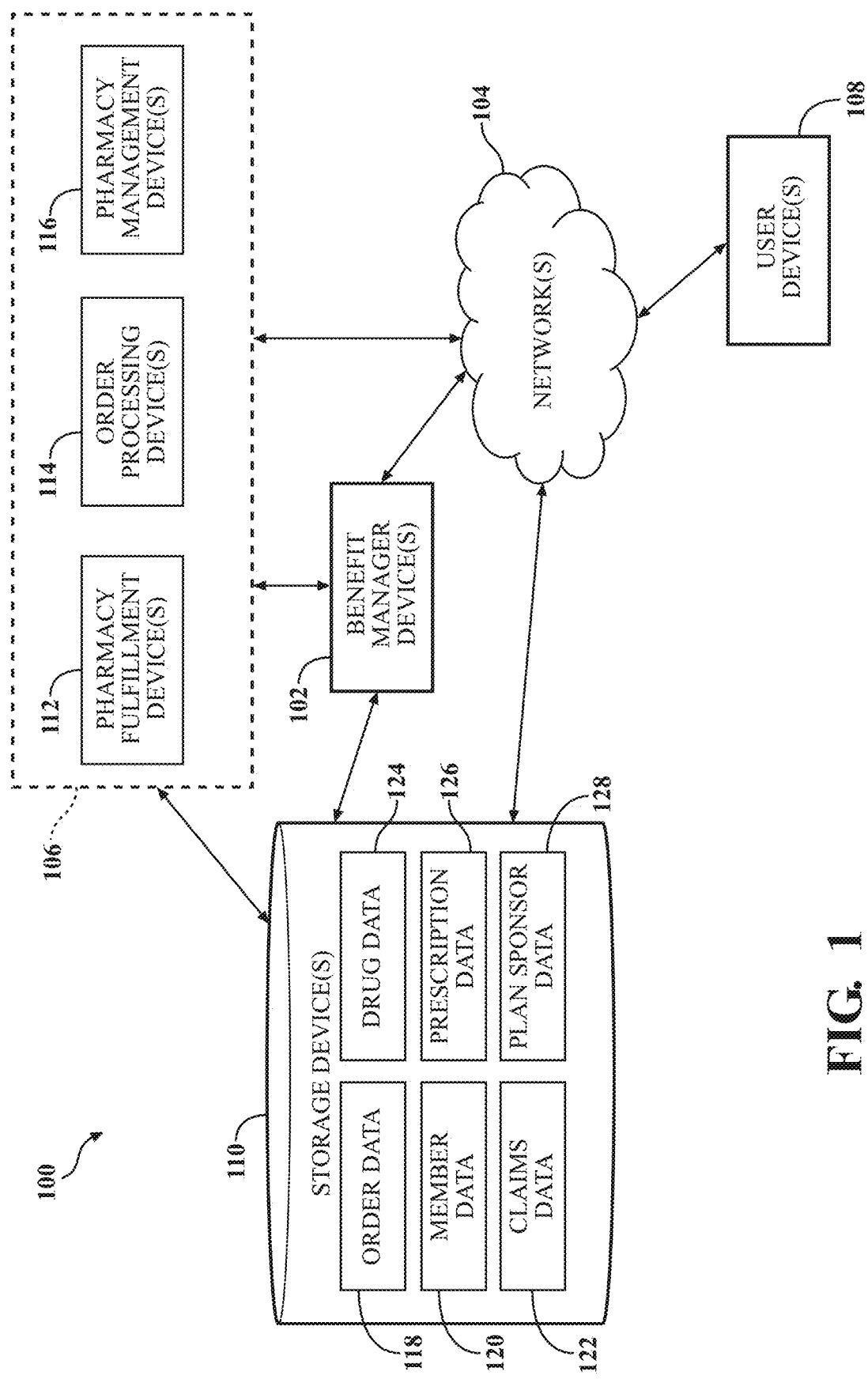
FIG. 1 is a schematic view depicting an exemplary pharmaceutical system.

FIG. 1 is a block diagram of an example implementation of a system 100, according to an example embodiment. While the system 100 is generally described as being deployed in a high-volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy). A high-volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system may also include a storage device 110.

The benefit manager 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high-volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high-volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HAS) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The plan sponsor or PBM devices (or systems) can enroll member in a multi-dose medication packaging system. This may improve adherence by how the prescription drugs are organized by the dose time for all of the different types of drugs and not in individual bottles of a single type of drug. In an example, the plan sponsor can further designate a prescription fill with multiple types of drugs to be filled with the blister pack as described herein with the multiple drugs arranged in a dose time but in separate wells so that the drugs in the multidose do not physically touch and/or being fluidly isolated from adjacent pills in wells for the same dose or adjacent doses.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include an optical network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Va.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114, e.g., at least part of an order can be filled in the multidose form as described herein. The order processing device 114 may be deployed in the system 100, or may otherwise be used.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

The order processing device 114 can operate to fill an order with a multidose delivery form factor, e.g., the blister pack as described herein. The order processing device 114 organizes the prescription drugs into dosing times for all of the different types of drugs and not in individual bottles each containing a single type of drug. In an example, the order processing device 114 can further designate a prescription fill with multiple types of drugs to be filled with the multidose form factor, e.g., blister pack, as described herein with the multiple drugs arranged in a assigned dose time but in separate wells so that the drugs in the multidose form factor do not physically touch.

In an example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. In the case of a plurality of drugs, the drugs are organized into times where at least one drug is to be taken and, in some cases, when multiple drugs are taken to develop a multidose schedule. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems, or may be a multi-use device that has functionality outside off analysis of the methods and systems. Examples of the user device 108 include a set-top box (STB), a receiver card, a mobile telephone, a personal digital assistant (PDA), a display device, a portable gaming unit, a computing system, and the like. Other devices, however, may also be used. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. The container can be a multidose package. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, multidose packaging and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications. The image of the pills can be embossed or printed on the multidose container.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

The presently described embodiment can be used with a prescription filling system such as that described in U.S. patent application Ser. No. 16/538,294, which is hereby incorporated by reference, with the present multidose packages being supplied as unit of use packages or replacing the belt segments of multidose packaging.

Figure 2:
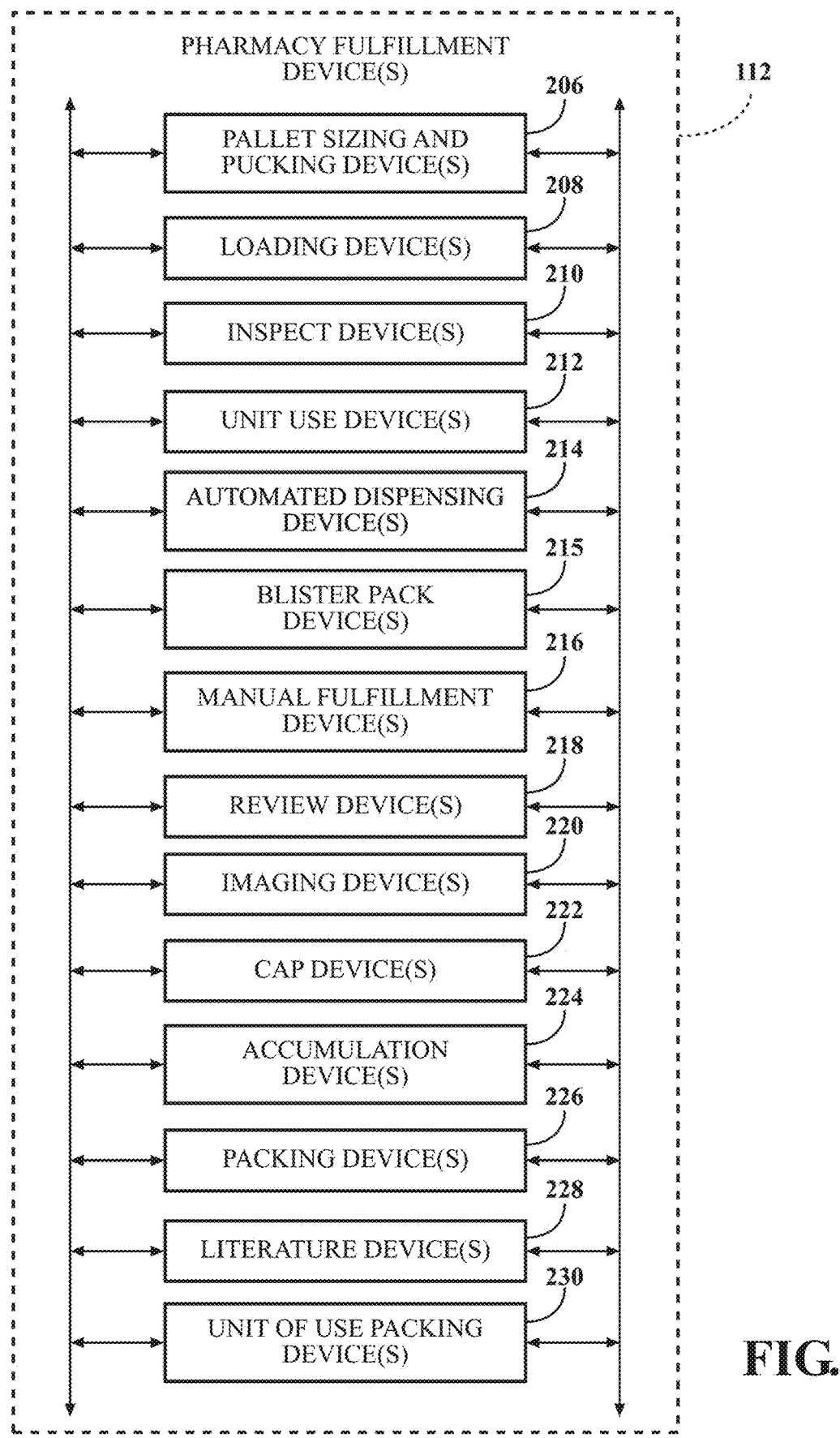
FIG. 2 is a schematic view depicting an exemplary pharmacy fulfillment device.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, blister pack or multidose device(s) 215, manual fulfillment device(s) 216, review device(s) 218, imaging device(s) 220, cap device(s) 222, accumulation device(s) 224, literature device(s) 228, packing device(s) 226, and unit of use packing device(s) 230. Further, the pharmacy fulfillment device 112 may include additional devices, which may communicate with each other directly or over the network 104.

In some embodiments, operations performed by one or more of these devices 206-230 may be performed sequentially, or in parallel with the operations of devices as may be coordinated by the order processing device 114. In some embodiments, the order processing device 114 tracks a prescription with the pharmacy based on operations performed by one or more than one of the devices 206-230.

In some embodiments, the pharmacy fulfillment device 112 may transport prescription drug containers, for example, between more than one of the devices 206-230 in a high volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high-volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping, or may be shipped in combination with other prescription drugs dispensed by other devices (e.g., in the high volume fulfillment center).

At least some of the operations of the devices 206-230 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high volume fulfillment center.

The blister pack device 215 may include one or more device that forms a plurality of pockets into a plastic sheet, fills those pockets with solid medications, and captures the medications in the pockets with a covering. As discussed in further detail below, the blister pack device is able to rapidly form, fill, and package blister packs that are customized to a user's medication schedule as dictated by a medical care provider and/or pharmacist. The blister pack device 215 can form individualized containers based on the pill types, the number of pills and the dose schedule for an individual prescription drug schedule.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high-volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station. The review station can allow for imaging of the multidose package for review of the automated filled the drug order, e.g., the package with wells as described herein. In an example embodiment, the pharmacist review may be conducted with an imaging device that looks through the transparent side or wells of the multidose package with images of the filled package and computer records regarding the treatment regime.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118. The imaging device 220 can check the individual wells and the individual pills in the specific wells to check the order for correct filling of the order.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high-volume fulfillment center. The cap device 222 can be used to brand the top of the well containing package, e.g., by printing or etching the material on the back of the well or in the well itself. Branding includes any messaging or indicia relating to the patient, the pharmacy, or the contents in the well.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order. The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The multidose order can be placed into a box or a bag for shipment to the patient location. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 230 packages a unit of use prescription order in preparation for shipping the order.

The pharmacy fulfillment device 112 in FIG. 2 may include single devices 206-230 or multiple devices 206-230 (e.g., depending upon implementation in a pharmacy). The devices 206-230 may be the same type or model of device or may be different device types or models. When multiple devices are present, the multiple devices may be of the same device type or models or may be a different device type or model. The types of devices 206-230 shown in FIG. 2 are example devices. In other configurations of the system 100, lesser, additional, or different types of devices may be included.

Moreover, multiple devices may share processing and/or memory resources. The devices 206-230 may be located in the same area or in different locations. For example, the devices 206-230 may be located in a building or a set of adjoining buildings. The devices 206-230 may be interconnected (e.g., by conveyors), networked, and/or otherwise in contact with one another or integrated with one another (e.g., at the high-volume fulfillment center). In addition, the functionality of a device may be split among a number of discrete devices and/or combined with other devices.

Figure 3:
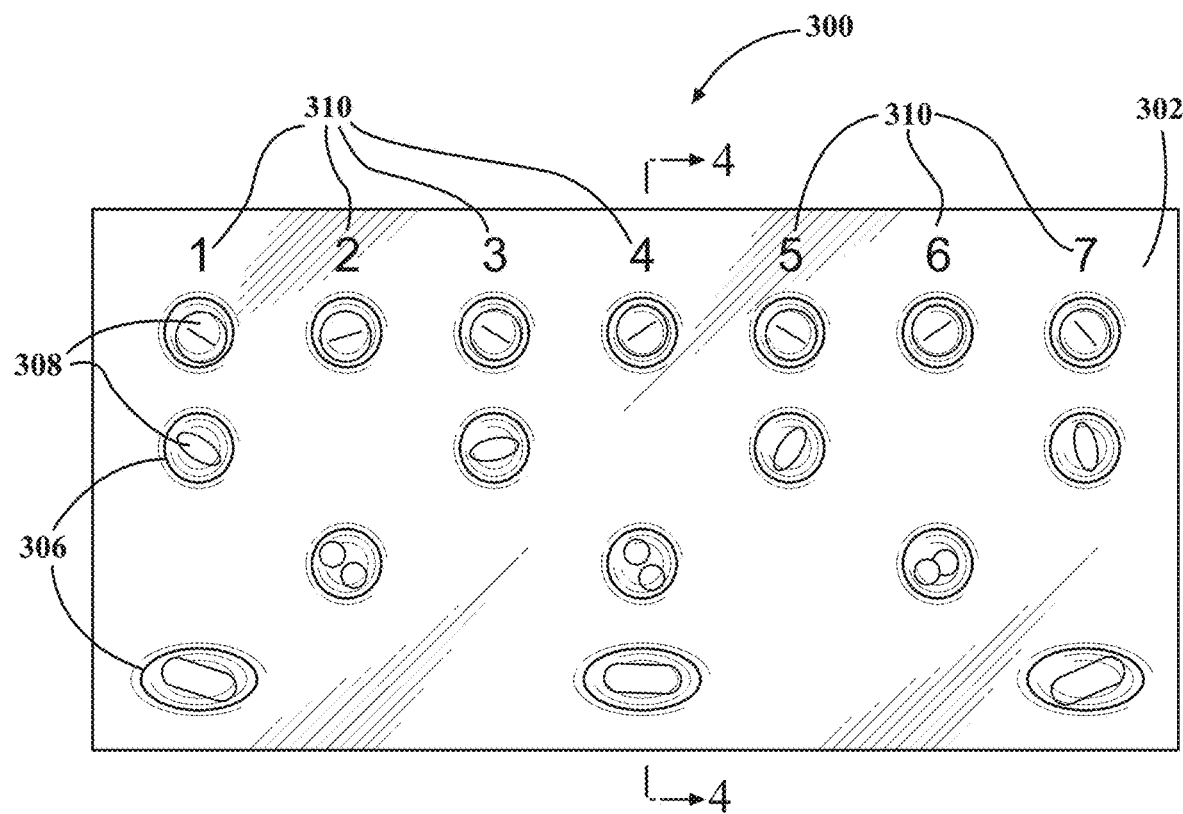
FIG. 3 is a top elevation view of a pill package constructed according to an exemplary embodiment of the subject disclosure.
Figure 4:
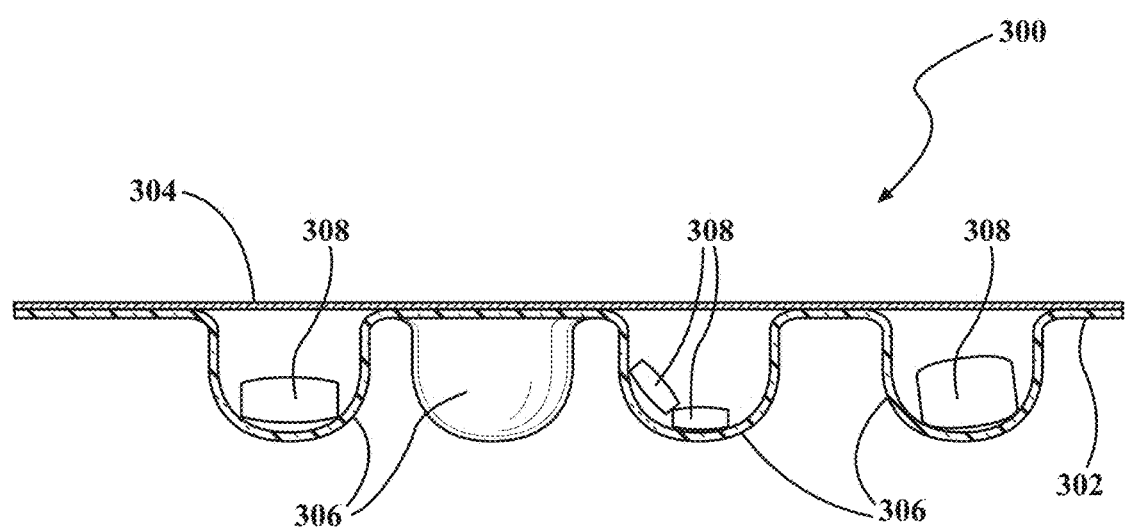
FIG. 4 is a cross-sectional view of the pill package of FIG. 3 taken through Line 4-4 of FIG. 3.

A custom blister pack 300 of the type that may be produced by the blister pack device 215 is generally shown in FIGS. 3 and 4. The blister pack 300 includes a container 302 and a covering 304. The container 302 is made of a plastic sheet that has been deformed (as discussed in further detail below) to present a plurality of pockets 306 or wells, which contain the medications 308. The pockets 306 are surrounded by a planar top surface. The medications 308 contained in the pockets 306 are hereinafter referred to as pills 308; however, it should be appreciated that other types of solid medications (such as tablets, gel caps, capsules or the like, i.e., non-liquid medications), may be employed. The pills 308 stored in the pockets 306 can include restricted access drugs, e.g., prescription drugs, supplements and/or vitamins, or even placebos. In an example, pockets can store multiple, individualized dry objects. In some embodiments, at least some of the pockets 306 contain only a single pill 308, which may extend the expiration dates of those pills 308 based on drug packaging regulations in certain markets that require shorter expiration dates of pills that are in physical contact with one another.

The pockets 306 are arranged in a plurality of rows of varying numbers of pockets 306 according to a user's personalized medication schedule or therapy regimen. More specifically, the sizes of the pockets 306 are variable so that the blister pack 300 can accommodate different types and numbers of pills 308 and arrange them according to the user's personalized medication schedule. For example, a first row may include a first number of packets, e.g., three pockets 306 shown in FIG. 3. A second row may include a second number of pockets, e.g., two pockets 306 as shown in FIG. 3. A third row may include a third number of pockets, e.g., two pockets 306 as shown in FIG. 3. A fourth row may include a fourth number of pockets, e.g., three pockets 306 as shown in FIG. 3. A fifth row may include a fifth number of pockets, e.g., two pockets 306 as shown in FIG. 3. A sixth row includes a sixth number of pockets, e.g., two pockets 306 as shown in FIG. 3. A seventh row includes a seventh number of pockets, e.g., three pockets 306 as shown in FIG. 3. The first, fourth, and seventh number of pockets 306 can include at least one quantity that is different from the quantity of the number of other pockets 306. In an example embodiment, at least some rows of pockets have a different number of pockets than other rows. In some embodiments, the blister pack 230 may include any suitable number of rows of pockets 306 and any suitable number of pockets 306 in each row. The blister pack 300 may also include variable gaps between adjacent rows pockets 306. The pockets 306 may be shaped and sized to accommodate the specific pill(s) 308 contained therein. For example, a pocket 306 that is provided to accommodate a small circular pill 308 can have a small, circular shape, and a pocket 306 that is provided to accommodate a large, oblong pill 308 can have a large, oblong shape.

The blister pack 300 may be specifically customized to a user's specific medication schedule or therapy regimen as dictated by the user's medical care provider and include a range of different pills 308 that are organized in an arrangement that allows for improved medication adherence by the user. For example, in one embodiment, each row of pockets 306 could include all of the pills 308 (which could be similar or different from one another) the user is to take in one day, thereby making it very easy for the user to take the correct medication dosages during each day. In the example embodiment of FIG. 3, seven rows (numbered 1-7) are provided, one row for each day of the week. In another embodiment, the rows could be associated with dose times. For example, a first row could contain the pills 308 the user is to take in the morning of a first day, the second row could contain the pills 308 that the user is to take in the evening of the first day, the third row could contain the pills 308 that the user is to take on the morning of a second day, etc.

In some embodiments, indicia is printed on the container 302 and/or on the covering 304 to instruct the user and further improve medication adherence and/or to identify the types of pills 308 contained in the blister pack 300. The blister pack also includes indicia 310 that identifies the contents of the blister pack and/or instructs the user how to take the pills. For example, in the embodiment of FIG. 3, the indicia includes a "1" adjacent the first row, a "2" adjacent the second row, etc. In some embodiments, the indicia 310 could be on the covering 304 in addition to or in lieu of the container 302 and could be aligned with the pockets 306. In some embodiments, the indicia 310 could include a date and/or time indicating the date/time that the pills 308 in the corresponding row should be taken according to the user's medication schedule. The indicia 310 may be printed onto the container 302 and/or the covering 304 such that it is visible from either or both sides of the blister pack 300, i.e., the side of the container 302 or the side of the covering 304. In some embodiments, the indicia includes printing on the covering 304 of what the pill 308 in the pocket 306 aligned with the indicia. In other words, the covering 304 includes a plurality of different indicia that specifically identify to the user which pills 308 are in which pockets 306 to assist the customer in determining what pill 308 to take and prevent the user from mistakenly dispensing the incorrect pill 308. The indicia can also identify the sizes of the pockets 306 to further assist the user in determining which area of the covering 304 to break to dispense the desired pill(s) 308. In some embodiments discussed in further detail below, the indicia can include coding, such as quick response (QR) codes, which can provide data to a smart device to assist with the tracking of a user's adherence to their medication schedule.

Some of the pockets 306 have a first size, and some of the pockets 306 have a different (larger or smaller) second size for accommodating differently sized, shaped, and/or numbers of pills 308 or for accommodating multiple pills 308 in a single pocket 306. Any number of pocket 306 sizes may be provided in a single blister pack 300. In some embodiments, the pockets 306 are fluidly sealed from one another, and at least one of the pockets 306 includes only a single pill 308 to extend the expiration dates of those pills 308. In an example embodiment, each pocket 306 includes only a single pill 308.

In some embodiments, the container 302 is made of a transparent plastic material, thereby allowing the pills 308 in the pockets 306 to be visually inspected either at the pharmacy before the container 302 is shipped to the customer and/or by the customer prior to a dispensing event. In an embodiment, the pills 308 are photographed through the container 302 prior to the container 302 leaving the pharmacy for quality control purposes. For example, the photographs can be compared against computer-generated images of what the filled container 302 should look like with the proper arrangement of pockets 306 and the proper pills 308 located in those pockets 306, and the container 302 can be quarantined for further evaluation if the images do not match. Also, the photographs may be stored in a database on a memory to be referenced if there is an issue with any of the pills 308 or with the container 302 at a later time. In other embodiments, the container 302 may be opaque.

The covering 304 is attached with the planar top surface of the container 302 to trap the pills 308 within the pockets 306, thereby closing the blister pack 300. In some embodiments, the covering 304 has the form of a plastic or paper film or a metal (for example, aluminum) foil or some combination thereof. In other words, the covering 304 may include multiple layers of differing materials. For example, in one embodiment, the covering includes both an aluminum foil layer and a paper layer. The covering 304 may be either transparent or opaque. The covering 304 may be configured to either be punctured (e.g., frangible) or peeled away from the container 302 by the user to allow access to the pills 308 contained within the pockets 306.

Figure 5:
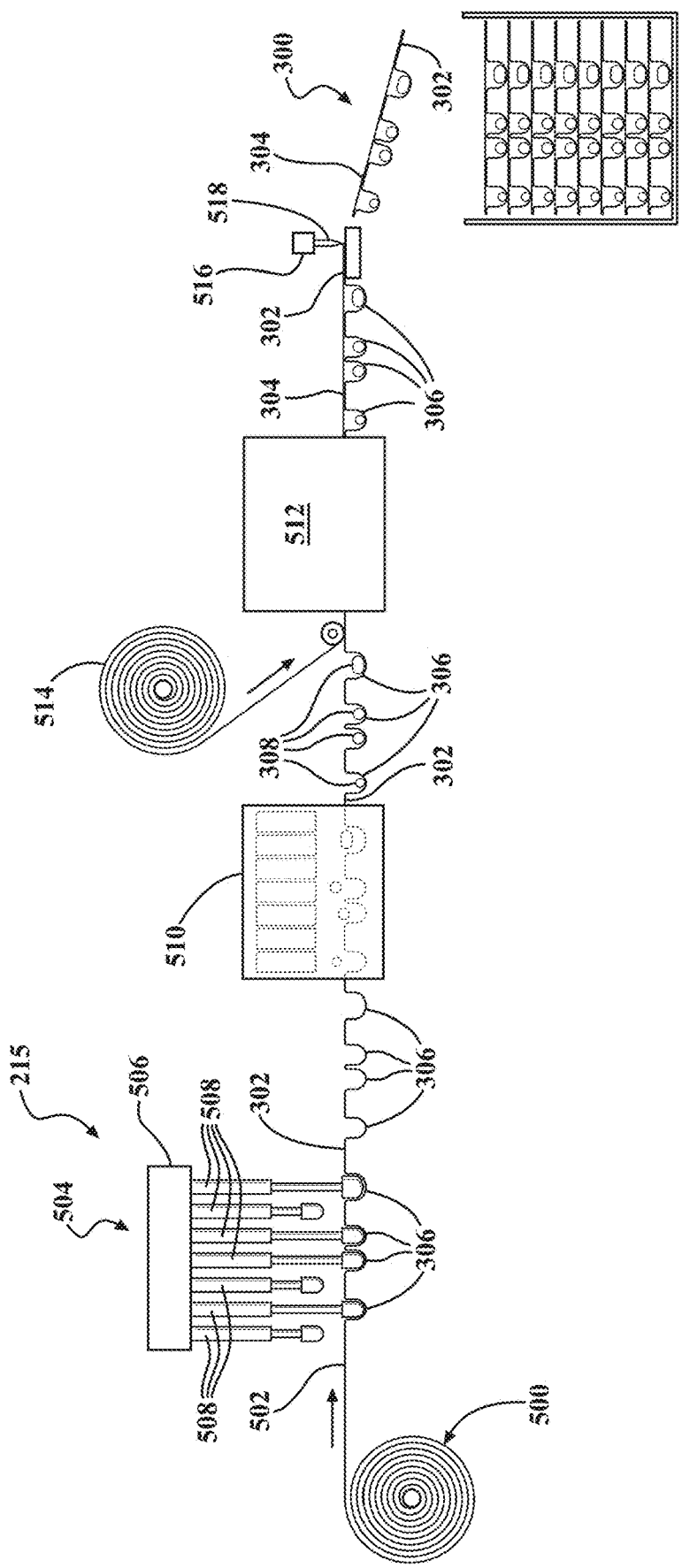
FIG. 5 is a schematic view depicting an exemplary blister pack device for making and filling blister packs.
Figure 6:
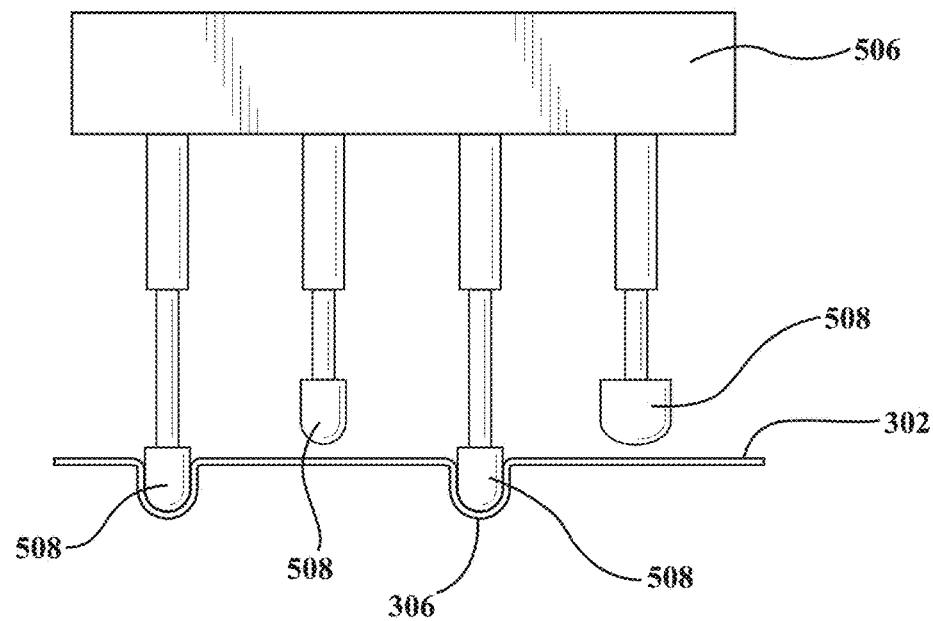
FIG. 6 is a side and cross-sectional view of a pocket forming station of the blister pack device of FIG. 5.
Figure 7:
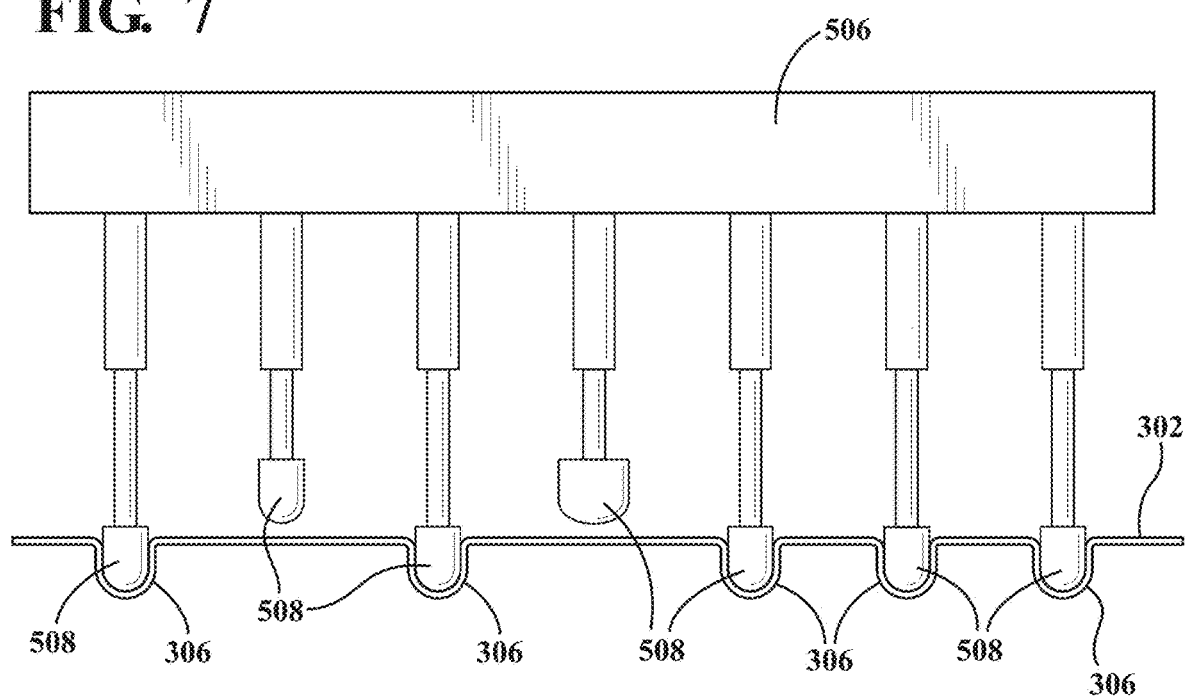
FIG. 7 is a front elevation view of a pocket forming mechanism.

FIG. 5 shows a blister pack device 215 of the type that is capable of rapidly producing customized blister packs 300, such as the blister pack 300 shown in of FIGS. 3 and 4. That is, the blister pack device 215 is able to both rapidly produce and fill very different blister packs 300, such as blister packs 300 that have different arrangements of pockets 306 and/or blister packs 300 that have different pills 308 or arrangements of pills 308. Thus, the blister pack device 215 is able to rapidly produce blister packs 300 that are customized to many users' specific medication therapy regimens.

The blister pack device 215 includes a plastic sheet supply 500 that includes a quantity of plastic sheeting 502 and that can feed the plastic sheeting 502 in a flow direction, which is identified with an arrow. In the example embodiment, the plastic sheet supply 500 has the form of a continuous roll of plastic sheeting 502. In other embodiments, the plastic sheet supply takes other forms. For example, in some embodiments, the plastic sheeting may be pre-cut to identical or differing lengths. The lengths may correspond to the number of rows for a period of prescription drugs, e.g., one week, two weeks, thirty days, one hundred eighty days, or the like.

Figure 8:
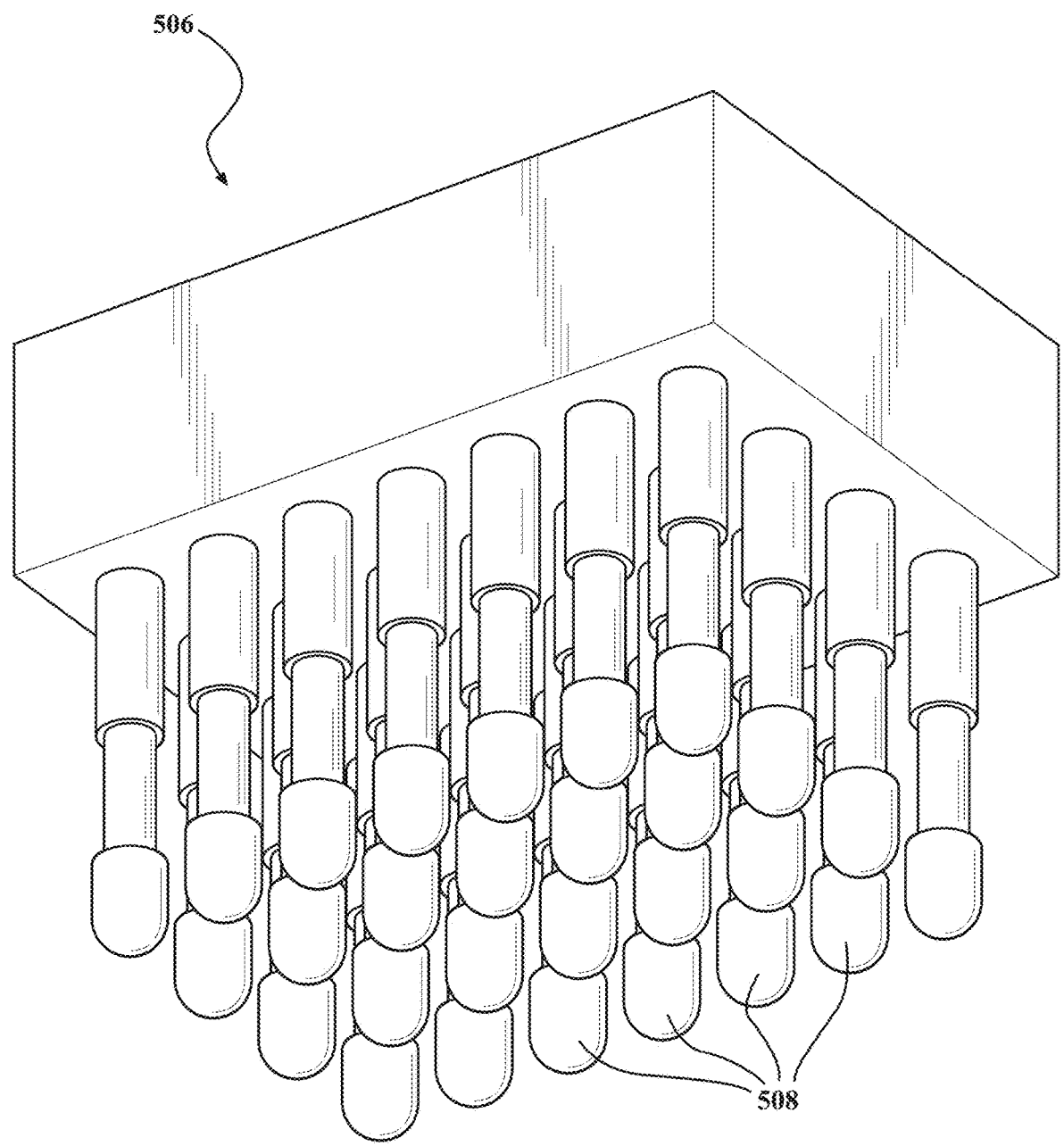
FIG. 8 is a cross-sectional view of the pocket forming station of FIG. 5 taken from a different angle than FIG. 6.

Downstream of the plastic sheet supply 500, the blister pack device 215 includes a pocket forming station 504 that includes a pocket forming mechanism 506 that is configured to controllably deform the plastic sheeting 502 to create the aforementioned plurality of pockets 306, thereby shaping the containers 302. With reference to both FIGS. 5 and 8, in an example embodiment, the pocket forming mechanism 506 includes a plurality of independently actuatable plungers 508 that are spaced apart from one another and that can move vertically upward and downward towards and away from the plastic sheeting 502 under the influence of an actuator to deform the plastic sheeting 502 according to a pre-set pattern, as discussed in further detail below. The plungers 508 can include feet that form the pockets with the feet being of a size associated with the pocket. The plungers can be chosen to form the appropriate size well for the number and size of the pills being placed in the pocket assigned to a single dose in the multidose regimen. In an embodiment, the pocket forming mechanism 506 is configured to form a first set of pockets 306 for a first container 302 and then space that first set of pockets 306 from a second set of pockets 306 for a second container 302. In some embodiments, the pocket forming station 504 may further include a heater that can warm the plastic sheeting 502 prior to the deformation.

In one embodiment, the plungers 508 remain stationary in the flow direction and plastic sheeting 502 is indexed forwardly and stops while the plungers 508 are activated to form the pockets 306 into the plastic sheeting 502. For example, in the exemplary embodiment of FIG. 8, the pocket forming mechanism 506 has a seven-by-four (7×4) grid for a total of twenty-eight total plungers 508 so that up to twenty-eight individual pockets 306 can be formed simultaneously into the plastic sheeting 502. In alternate embodiments, the pocket forming mechanism is configured to form the pockets 306 into the plastic sheeting as the plastic sheeting moves continuously in the flow direction through the blister pack device. The pocket forming mechanism 506 is discussed in further detail below.

From the pocket forming station 504, the newly formed container 302 continues to a filling station 510, which is configured to insert one or more pills 308 into each of the pockets 306 of the container 302. The filling station 504 preferably includes a supply of a range of different types of pills 308 and is able to selectively insert those pills 308 into the pockets 306 according to a preset arrangement that is based on a user's customized therapy regimen as dictated by the user's medical care provider. The filling station 504 is also discussed in further detail below.

From the filling station 510, the container 302 proceeds to a covering station 512. The covering station 512 receives both the container 302 and a continuous strip of the covering material (such as a foil and/or paper-based film as discussed above) from a covering supply 514 and applies the covering 304 onto the planar top surface of the container 302 to trap the pills 308 in the pockets 306. In the exemplary embodiment, the covering supply 514 is a continuous roll of the covering material.

The covering 304 may be attached with the container 302 through any suitable attachment process including, for example, through the application of an adhesive onto the covering 304 and/or onto the planar top surface of the container 302 prior to contacting the covering 304 with the container 302. In some embodiments, the adhesive is a pressure sensitive adhesive that allows the covering 304 to be peeled away from the container 302 by the user. In other embodiments, the adhesive is more permanent, thereby requiring the customer to puncture the covering 304 to remove the pills 308 from the pockets 306 of the container 302. In an example, the adhesive can be heat activated or ultrasonically activated to fix the covering 304 to the top, essentially planar surface of the container 302. In an example embodiment, the covering 304 can be sonically welded to the base material of the container, e.g., around the perimeter of the container 302. In an example embodiment, the covering 304 is fixed to the base material of the container 302 intermediate the pockets 306 containing solid form contents, e.g., pills 308.

The covering 304 can be a polymer sheet or a foil sheet. The sheet can cover a single container 302 or can be a continuous sheet that can be laid down over multiple containers 302 that are subsequently separated from one another. In an example embodiment, the covering 304 can include multiple layers, e.g., a foil sheet adjacent and adhered to the top, essentially planar surface of the container 302 and a polymer layer fixed over the foil layer. The polymer layer can be peeled off of the pockets 306, e.g., starting at perforated corners in the polymer layer. After the polymer layer is peeled back, the foil layer can be easily broken such that the contents in the pocket 306 can be forced or moved past the foil layer.

At a cutting station 516, the containers 302 are separated from one another by an automatic cutter 518. They may then be packaged and shipped to the customer. In some embodiments, the cutting station 516 is configured to cut the containers 302 at different lengths according to the order. The automatic cutter 518 is able to cut both the covering 304 and the container 302 in a lateral or widthwise (perpendicular to the flow direction) direction to separate one filled customized container 302 from another adjacent container 302. The automatic cutter 518 may be a cutting blade or a laser cutter. An inter-container gap in the material forming the containers 302 is larger than a gap between adjunct rows of pockets 306 intra-container with the cut for separating adjacent containers 302 being made in the inter-container gap. In an example embodiment, the adjacent containers 302 are of different length but the same lateral dimension. As described herein, the pockets 306 in the adjacent containers 302 may have different numbers of pockets 306 formed therein or different size wells therein.

Figure 12:
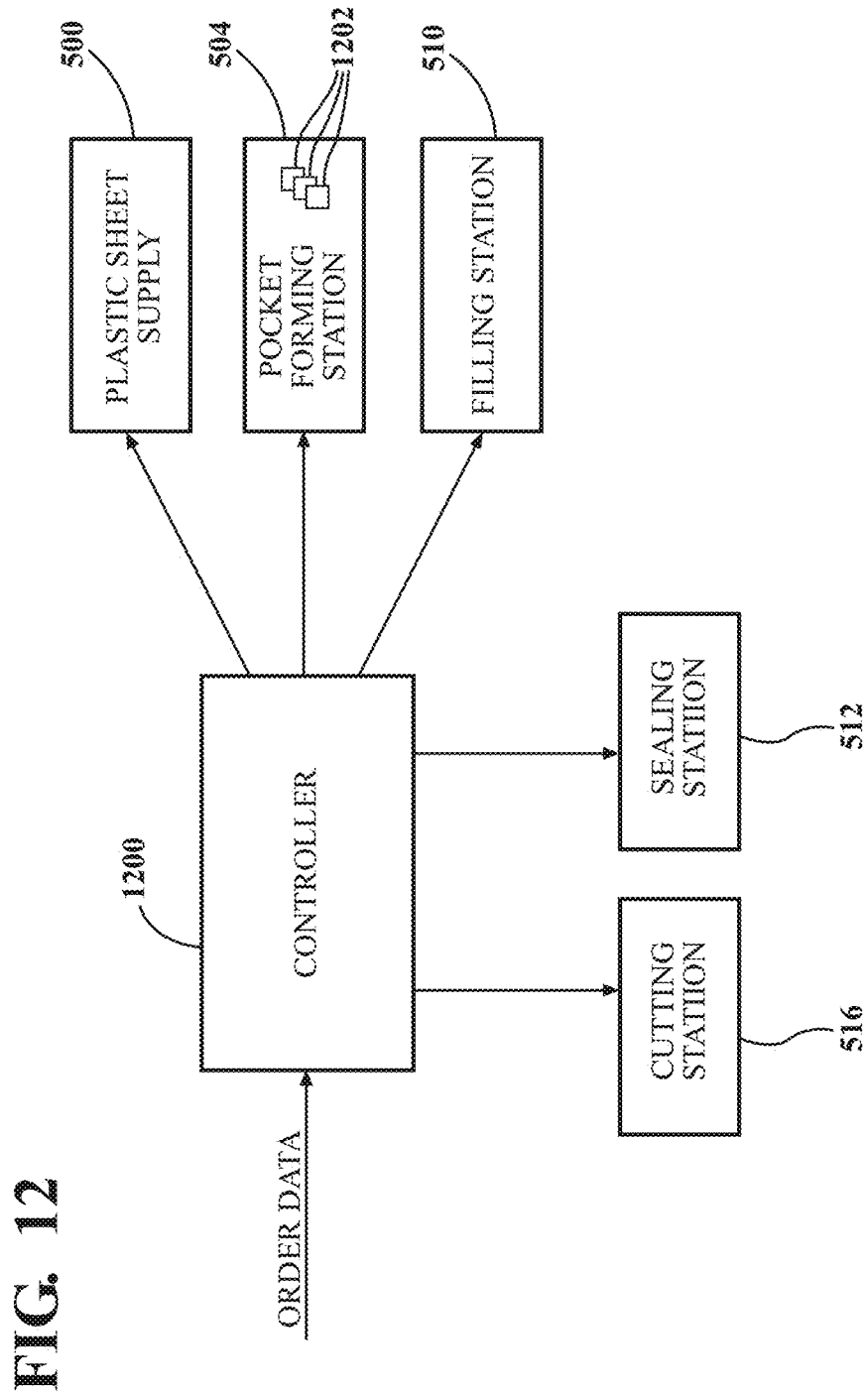
FIG. 12 is a schematic view depicting the electrical components of the blister pack device of FIG. 5.

Referring now to FIG. 12, the blister pack device 215 includes a controller 1200 that is in electrical communication with the plastic sheet supply 500, the pocket forming station 504, the filling station 510, the covering station 514, and the cutting station 516 to effectuate the automatic production and filling of customized blister packs. In this embodiment, the pocket formation station 504 includes a plurality of actuators 1202 that are in electrical communication with the controller 1200. In operation, the order processing device 114 (shown in FIG. 1) receives an order for a customized blister pack. In some embodiments, the order can be received by the order processing device 114 directly from a medical care provider. The order processing device 114 and/or the pharmacy management device 116 (also shown in FIG. 1) communicates the order to the controller 1200. The controller 1200, in turn, determines what the final configuration of the customized blister pack will be, e.g., the number of pockets, the arrangement of pockets, the sizes of the pockets, the pills to be inserted into each pocket, and the indicia to be printed onto the blister pack.

The controller 1200 operates the various components of the blister pack device 215 to automatically produce the customized blister pack as determined by the controller 1200. Specifically, the controller 1200 instructs the plastic sheet supply 500 to supply a predetermined length of plastic sheeting 502 to the pocket forming station 504. At the pocket forming station 504, the controller 1200 halts the movement of the plastic sheeting 502 and actuates the pocket forming mechanism 506 to form at least one pocket 306 into the plastic sheeting 502, thereby turning the plastic sheeting 502 into a container 302. At the filling station 510, the controller 1200 operates one or more filling mechanisms to dispense a plurality of pills into the pockets according to the order instructions. At the covering station 512, the controller 1200 automatically directs the application of the covering onto the plastic sheeting. This may include applying an adhesive to the covering and/or the plastic sheeting prior to contacting the covering with the plastic sheeting. The covering station 512 may, in an example embodiment, apply a foil layer over the top surface of the container 302. A polymer layer may be placed on top of the foil layer. The covering station 512 may include a directed heat source to apply heat to the adhesive, which can be a heat activated adhesive. The covering station 512 may include an ultrasonic welding gun to energy to activate the adhesive or create a weld between the top covering sheet (e.g., polymer sheet) and either the foil or directly to the top surface of the container 302. At the cutting station 512, the controller 1200 directs the automatic cutter to cut the covering and plastic sheeting at a predetermined location to separate one customized and filled blister pack from the next customized and filled blister pack. The cutting station 512 can include a blade or a laser cutter to separate adjacent containers 302. The blade or laser cutter cuts essentially perpendicular to the direction of travel of the covering, single or multilayer, and the plastic sheeting.

Referring now to FIGS. 6-9, one embodiment of the pocket forming mechanism 506 is shown. In this embodiment, the pocket forming mechanism 506 includes a plurality of plungers 508 that are arranged in a grid in both the flow direction and the lateral direction, which extends perpendicularly to the flow direction. Each plunger 508 has a pocket forming surface that is configured to directly engage the plastic sheeting and leave an imprint in the plastic sheeting in the shape of itself, thereby creating the pocket 306. The plungers 508 may have differing sizes and/or shapes for producing differently shaped pockets 306 into the plastic sheeting. For example, a first plunger may have a first size and a first shape, and a second plunger may have a different size and/or a different shape.

Each plunger 508 includes an independent actuator so that the plungers 508 are independently actuatable. In other words, any one or any desirable combination of the plungers 508 can be actuated by the controller in a downward direction to form a pocket into the plastic sheeting 502 aligned with those plungers 508 at any time. In some embodiments, the actuators are electric, pneumatic, and/or hydraulically powered.

In operation, the plastic sheeting is brought to a location directly beneath the pocket forming mechanism 506. The pocket forming mechanism 506 then receives an instruction from the controller 1200 (shown in FIG. 12) and actuates the plungers 508 according to a pattern determined by the controller 1200 in order to form into the plastic sheeting the correct pattern of pockets 306 to produce the container 302 having the appropriate arrangement of pockets 306.

In an embodiment, the pocket forming mechanism 506 includes a quantity of plungers 508 sufficient to create all of the pockets 306 in an entire container simultaneously by actuating the appropriate plungers 508 to form multiple rows of pockets 306. In another embodiment, the pocket forming mechanism includes only a single row of plungers, and the plastic sheeting is advanced incrementally to form each row of pockets separately from one another using the same row of plungers.

In some embodiments, the plastic sheeting 502 is advanced in indexing fashion through the pocket forming station 504. In other words, the plastic sheeting 502 is moved forwardly in between actuations of the plungers 508 and is halted during the actuations of the plungers 508. In some embodiments, the plungers may be configured to move in the flow direction at the same rate as the plastic sheeting, thereby allowing the plastic sheeting to continue moving while the pockets are formed therein within the pocket forming station. Allowing the plastic sheeting to continue advancement through the pocket forming station may increase the rate that the blister pack device is able to produce blister packs.

Figure 9:
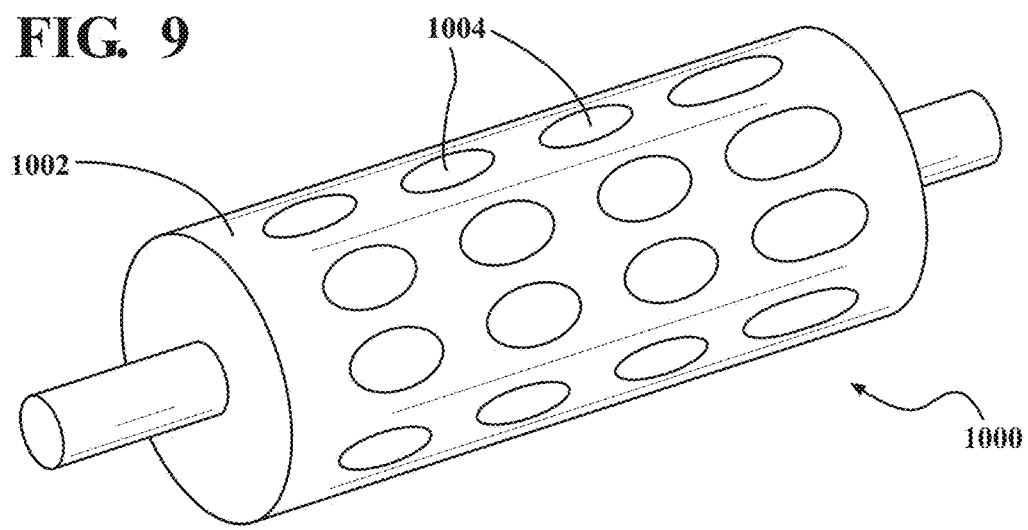
FIG. 9 is a perspective elevation view of the pocket forming mechanism of FIG. 7.
Figure 10:
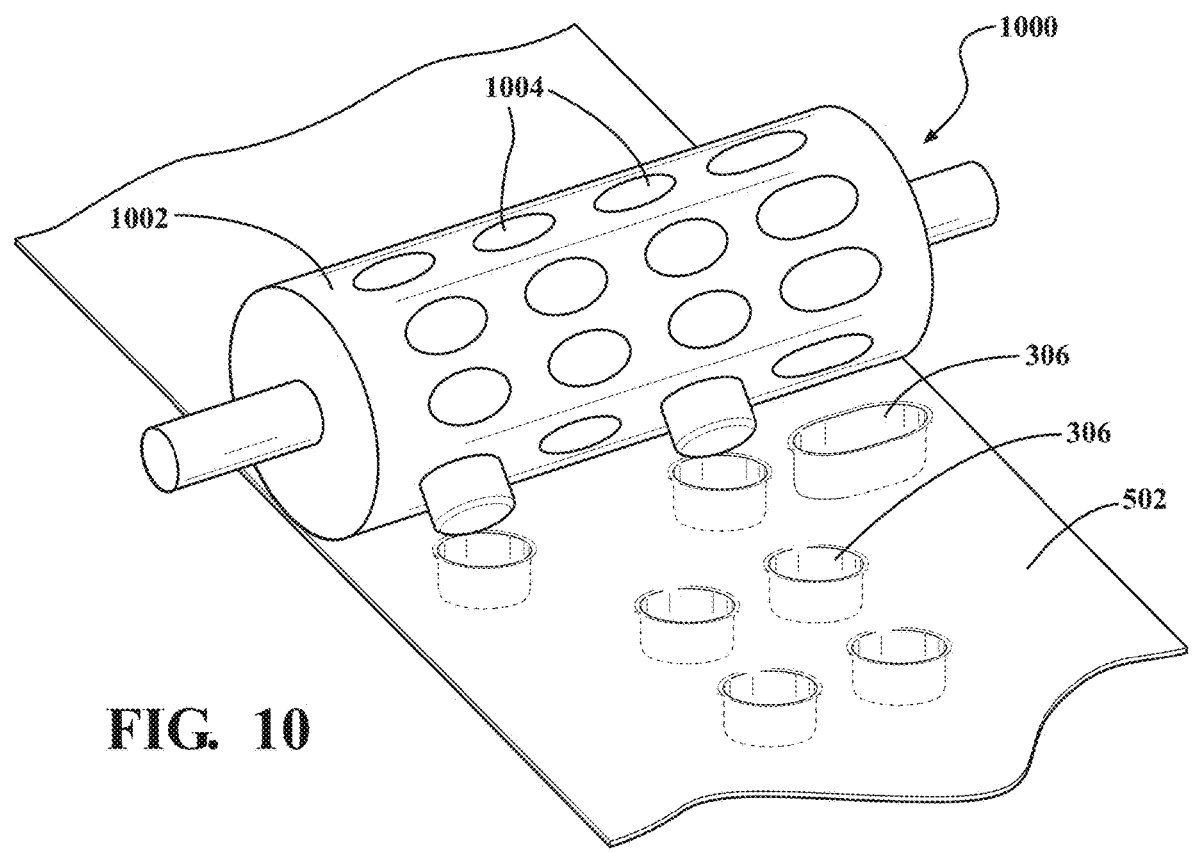
FIG. 10 is a perspective elevation view of an alternate embodiment of the pocket forming mechanism.
Figure 11:
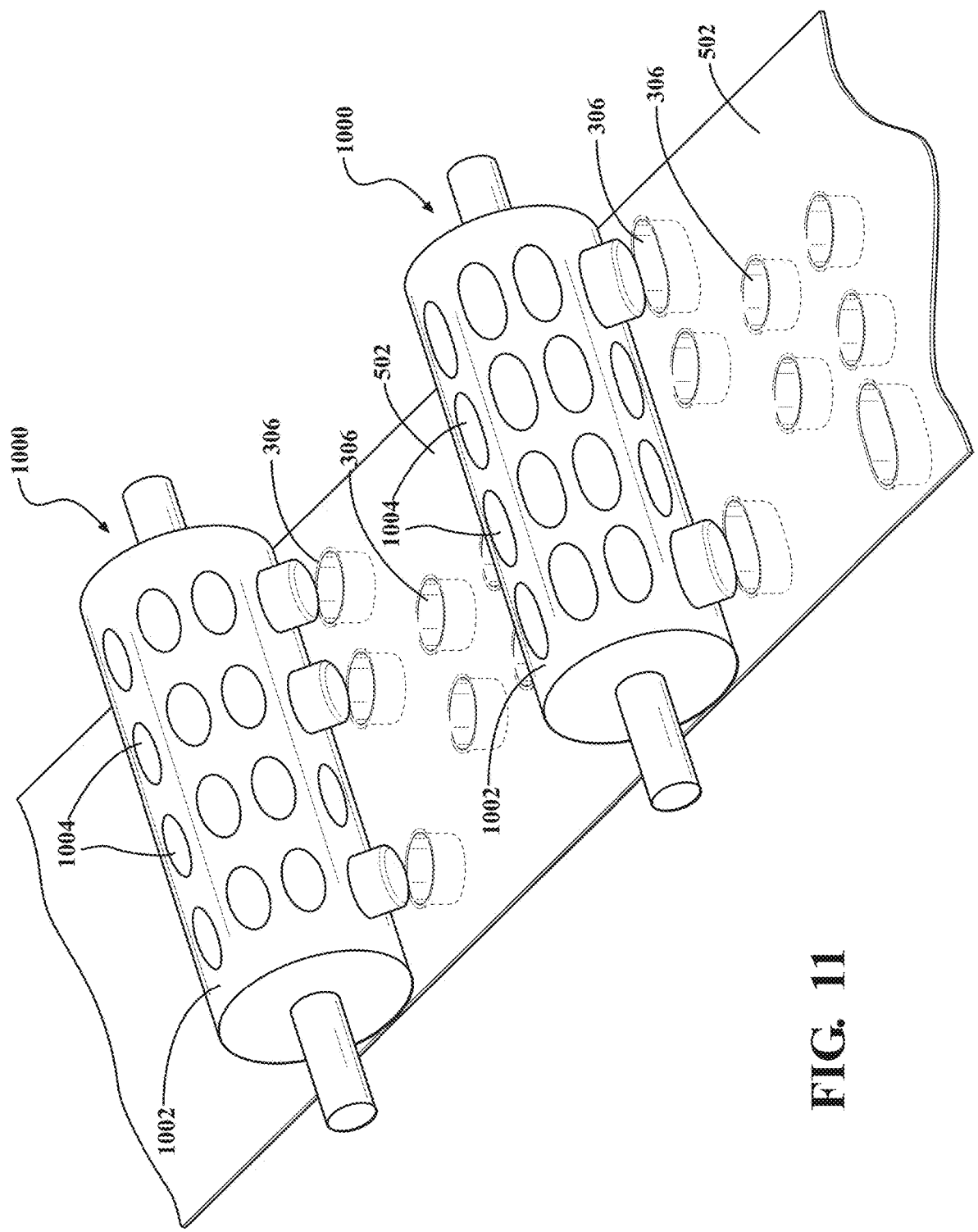
FIG. 11 is a perspective elevation view of another alternate embodiment of the pocket forming mechanism.

Another embodiment of the pocket forming device is shown in FIGS. 9-11. In this embodiment, the pocket forming device 1000 has the form of a drum 1002 that can roll along the planar top surface of the plastic sheeting 502. The drum 1002 includes a plurality of pocket formation features 1004 that can selectively move into and out of the drum 1002, i.e., towards and away from a central rotation of axis. In operation, the controller 1200 (shown in FIG. 12) actuates one or more actuators to move the pocket formation features 1004 outwardly to deform the plastic sheeting and create the pockets 306. The controller 1200 can also retract the pocket formation features 1004 into the drum 1002 so that pockets 306 are not created as that portion of the drum 1002 rolls along the plastic sheeting 502. The drum 1002 includes a plurality of rows of pocket formation features 1004 that are spaced circumferentially from one another with each row including a plurality of pocket formation features 1004. For example, in one embodiment, each row includes four pocket formation features 1004. In other embodiments, each row may include one to three pocket formation features or more than four pocket formation features. In some embodiments, the pocket formation features have different shapes and/or different sizes for creating differently shaped and/or sized pockets into the plastic sheeting.

The pocket formation features 1004 are independently actuatable according to instructions provided by the controller 1200 (see FIG. 12), thereby allowing any suitable arrangement of pockets 306 to be formed into the plastic sheeting 502 as the plastic sheeting 502 moves continuously through the pocket forming station 504 without stopping. In other words, any one or any combination of the pocket formation features 1004 can be extended to form pockets 306 into the container. As shown in FIG. 11, in an example embodiment, the pocket forming station 504 includes two or more drums 1002 that can include differently shaped or arranged pocket formation features 1004.

In another embodiment, the pocket forming features 1004 are openings that are in fluid communication with a vacuum. The openings can be selectively opened and closed by gates according to a pre-determined schedule as dictated by the controller to create a desired arrangement of pockets 306 in the plastic sheeting 502. In operation, as the drum 1002 rolls along the plastic sheeting 502, when a gate is opened, a pressure difference between the vacuum and the ambient pulls some of the plastic sheeting 502 into the opening 1004, thereby forming the pocket 306. Thus, in this embodiment, rather than the pocket forming features 1004 pushing on the plastic sheeting 502, the pocket forming features 1004 pull on the plastic sheeting 502. The drum 1002 can be thermally controlled (heated) to heat the plastic sheeting 502, thereby improving the deformation of the plastic sheeting 502 to create the pockets 306.

Figure 13:
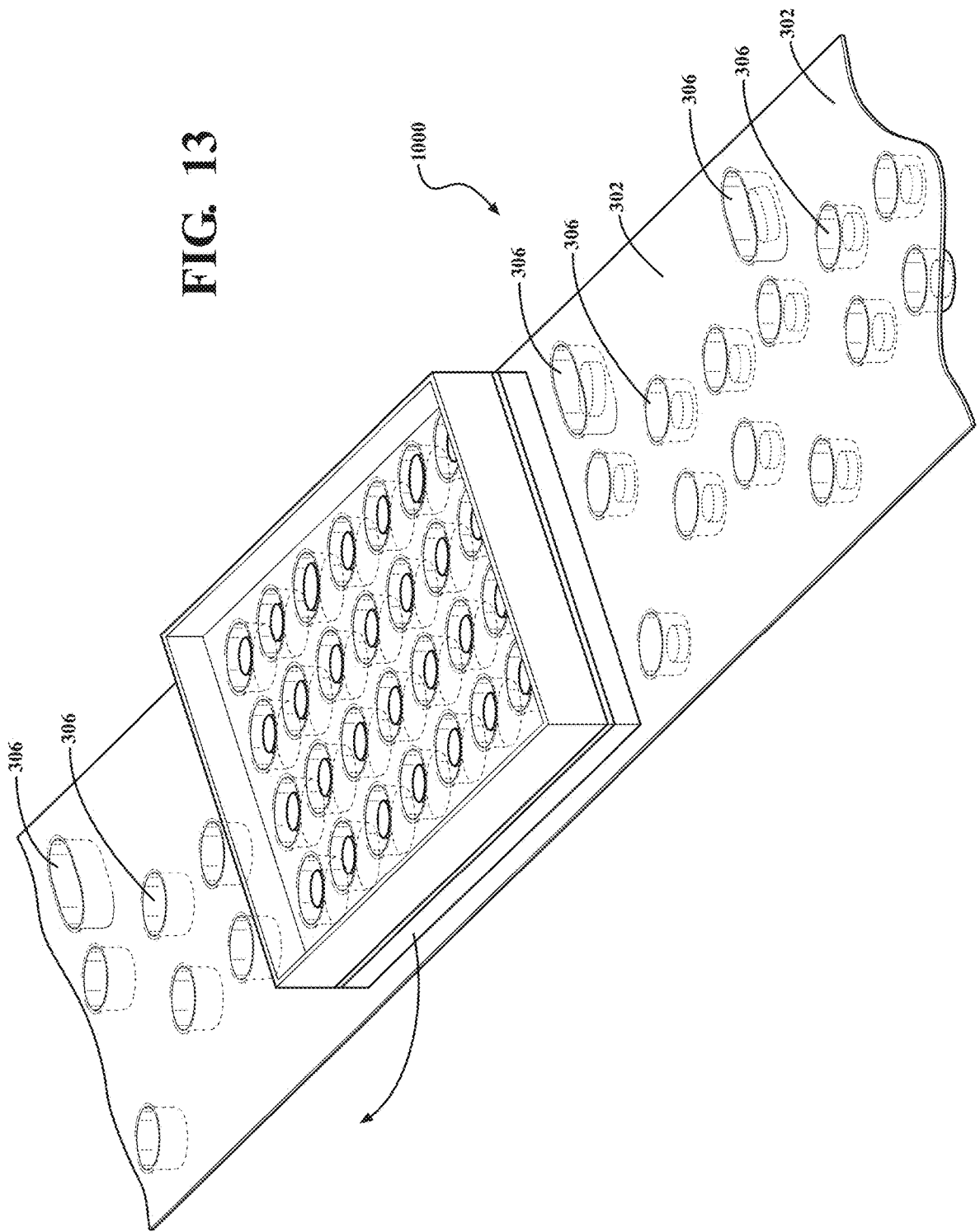
FIG. 13 is a perspective elevation view of a filling device of the type that can be employed in the blister pack device of FIG. 5.

FIG. 13 illustrates an exemplary filling device 1300 for filling the pockets 306 of a container 302 in the filling station 510 (shown in FIG. 5). The filling device 1300 includes a tray 1302 with a plurality of pill openings 1304 that extend through a bottom of the tray 1302. A door 1306 is positioned between the tray 1302 and the container 302 with the pockets 306 already formed therein. Pills 308 are arranged within the pill openings 1304 according to a predetermined pattern prior to the arrival of the container 302 in the filling station 510 as dictated by the order data. The pills 308 are prevented from falling out of the tray 1302 by the door 1306. When the pockets of the container 302 are aligned with the pill openings 1304, the door 1306 is swung open about an axis of rotation that extends vertically to allow the pills 308 to fall from the pill openings 1304 of the tray into the respective pockets of the container 302. In some embodiments, different trays 1302 may be utilized for different customized blister packs. In other embodiments, the pill openings can be configured to be selectively opened and closed independently of one another by the controller depending on the order information to either allow or restrict passage of the pills when the door is opened.

The present disclosure focuses on a container structure that has a base in which wells are formed with a covering sealing in solid, dry contents into the wells. However, the present disclosure is not so limited. In an example, a blister pack type container can be formed of thin-walled clear molded polymer material for holding individual contents, e.g., tablets, caplets or capsules, and is backed by a forcibly-tearable, e.g., frangible, foil backing sheet. The user of such an at least partially transparent blister pack can readily see the contents, e.g., items of medication, in each of several defined and individually sealed wells therein. By applying force from the front on the polymer well through the medication contained in the well onto the foil behind a chosen well, the user can cause a tear in the foil aligned with the well to thereby extract the contents of just that single well. The user can repeat the process for each well in the multidose. The other wells, not part of the multidose row, remain sealed and retain their contents for similar access as needed in the future.

The present disclosure also refers to a single multidose as being aligned in a row. It will be understood that a single multidose of wells can be arranged in columns.

Figure 14:
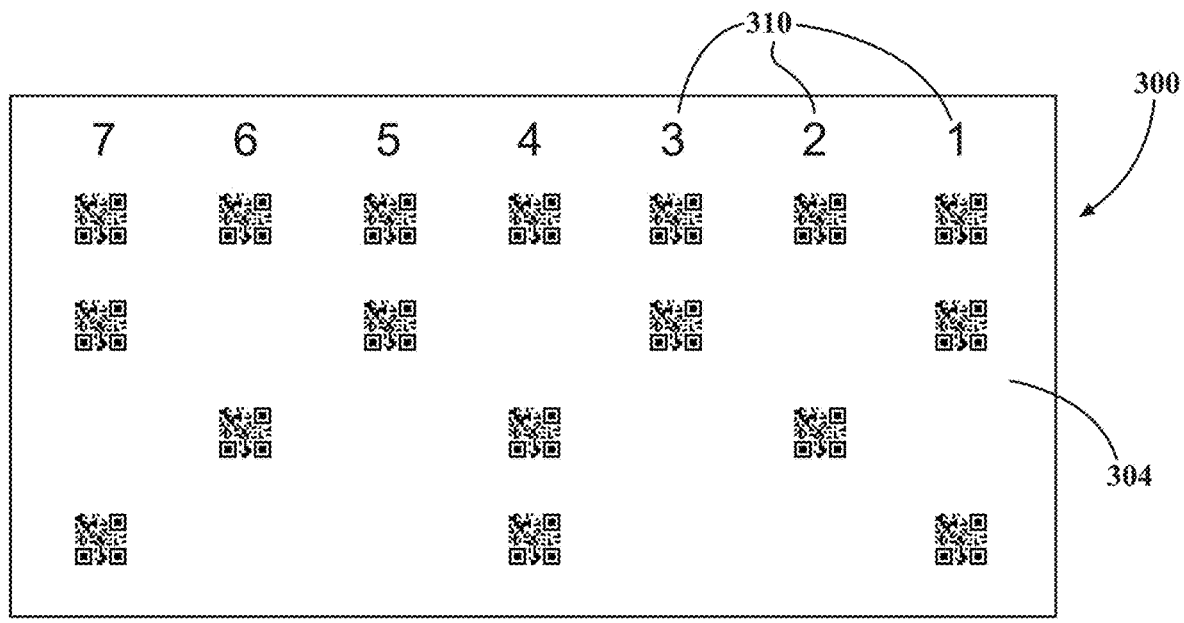
FIG. 14 is a back elevation view of an example embodiment of the blister pack of FIG. 3.
Figure 15:
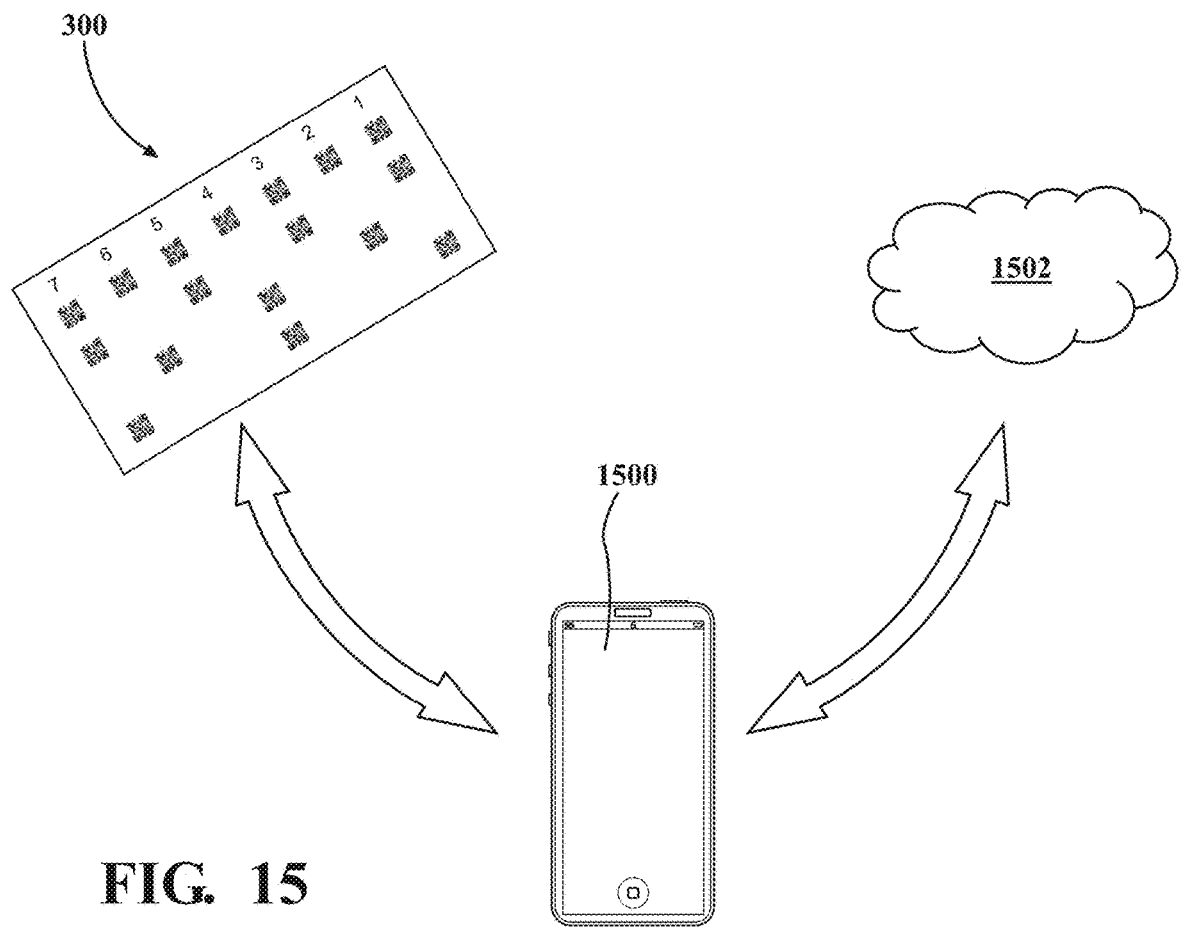
FIG. 15 is a schematic view illustrating the interaction of an electronic device with the blister pack of FIG. 14 and the communication of the electronic device with an external device.

Referring now to FIGS. 14 and 15, in some embodiments, the blister pack 300 includes a plurality of QR codes printed on the covering 304 and that can be scanned by the user using an electronic device 1500, such as a smart phone. The electronic device 1500 can communicate with a remote, cloud-based database 1502 via internet protocols to maintain a copy of the user's medication schedule in a memory of the electronic device 1500. The electronic device 1500 includes an app that can visually (using a display screen) and/or audibly (using a speaker) alert the user visually and/or audibly at each scheduled dispensing event. Before each dispensing event, the user scans the code prior to breaking the covering 304 to dispense the pill(s) contained within the pockets aligned with the codes. The electronic device 1500 compares the QR code to an expected QR code associated with the correct pill(s) to be taken. If the scanned QR code does not match the expected QR code, then the electronic device 1500 can provide an error message to the user to prevent the user from dispensing the incorrect pill. On the other hand, if the scanned QR code does match the expected QR code, then the electronic device 1500 can provide a positive affirmation to the user prior to breaking the covering and dispensing the pill(s).

The remote, cloud-based database 1502 may also maintain a database including a record of all dispensing events and may be accessed by the user, the medical provider, and/or a pharmacy to access this data from different devices and also to ensure that the data is not lost if the user loses or otherwise damages the electronic device 1500.

The app on the electronic device may also perform any of the following functions: history tracking of medication events; provide reminders, such as through text messaging, E-mail, or through a phone call; provide caregiver support; select, download, and delete data; allow the user to provide feedback after each medication take; allow the user to request a refill; control a rewards program which gives the user rewards for following a medication schedule; and warn the patient when a medication schedule attempts to pair incompatible medications. The app may further integrate with an existing electronic health records (HER) platform to automatically populate those records with a medication history. This may reduce the number of steps needed by both the user and the providers to set up a medication adherence program and limit mistakes from patients who self-enter their medication. This also allows the user or a third party to monitor the user's medication adherence, i.e., whether the user is dispensing the pill(s) from the blister pack 300 at the correct times.

The app may also be integrated with a telehealth platform to allow the user to launch a telehealth visit with a medical provider and receive medical advice pertaining to any of the pills contained in the blister pack 300.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A blister pack manufacturing assembly, comprising:
a supply including a quantity of a sheet of material;
a pocket forming station including at least one pocket forming mechanism that is configured to deform the sheet of material to include a plurality of pockets,
the at least one pocket forming mechanism including a plurality of forming members having outer forming surfaces, a plurality of actuators, and a controller that is configured to activate at least two different combinations of the plurality of forming members to form the plurality of pockets in the sheet of material;
a filling station including a quantity of pills and configured to insert the pills into the pockets formed in the sheet of material by the at least one pocket forming mechanism; and
a covering station where a covering is applied onto the sheet of material to trap the pills in the pockets;
wherein the plurality of forming members are disposed on a drum that can roll along the sheet of material and wherein the plurality of forming members can extend out of and into the drum.

2. The blister pack manufacturing assembly as set forth in claim 1 wherein the sheet of material is made of plastic.

3. The blister pack manufacturing assembly as set forth in claim 1 wherein the outer forming surfaces of some of the plurality of forming members have different shapes or different sizes for forming differently shaped or differently sized pockets in the sheet of material.

4. The blister pack manufacturing assembly as set forth in claim 1, wherein the plurality of forming members are independently actuatable with respect to one another and are moveable towards and away from the sheet of material under the influence of the actuators to deform the sheet of material according to a pre-set pattern.

5. The blister pack manufacturing assembly as set forth in claim 1, wherein the filling station includes different types of pills and is configured to selectively insert the different types of pills into the pockets in the sheet of material according to a preset arrangement.

6. The blister pack manufacturing assembly as set forth in claim 5, wherein the filling station is further configured to selectively insert different numbers of pills into different pockets in the sheet of material.

7. The blister pack manufacturing assembly as set forth in claim 5, wherein the filling station includes a tray with a plurality of pill openings that extend through a bottom of the tray.

8. The blister pack manufacturing assembly as set forth in claim 7, wherein the filling station further includes a door that is movable between a closed position in which the door is positioned between the tray and the sheet of material and an open position in which the door is not positioned between the tray and the sheet of material.

9. The blister pack manufacturing assembly as set forth in claim 8, wherein the door swings about a vertically extending axis of rotation between the closed and open positions.

10. The blister pack manufacturing assembly as set forth in claim 1, wherein the sheet of material is transparent.

11. The blister pack manufacturing assembly as set forth in claim 1, further including a cutting station that is configured to cut the sheet of material to form a plurality of containers, each of the containers including a plurality of pockets with pills.

12. The blister pack manufacturing assembly as set forth in claim 11, wherein the cutting station is configured to cut the sheet of material at different lengths so that at least some of the containers have different lengths.

13. The blister pack manufacturing assembly as set forth in claim 8, wherein the controller is further configured to control the supply, the at least one pocket forming mechanism, and the cutting station to automatically produce customized containers having predetermined arrangements of pockets.

14. The blister pack manufacturing assembly as set forth in claim 1, wherein the covering station is configured to adhesively attach the covering to the sheet of material.

15. The blister pack manufacturing assembly as set forth in claim 14, wherein the covering station is further configured to adhesively attach the covering to the sheet of material with a pressure sensitive adhesive.

16. The blister pack manufacturing assembly as set forth in claim 1, wherein each combination of the at least two different combinations of the plurality of forming members includes at least two forming members.

17. A blister pack manufacturing assembly, comprising:
a supply including a quantity of a sheet of material;
a pocket forming station including at least one pocket forming mechanism that is configured to deform the sheet of material to include a plurality of pockets,
the at least one pocket forming mechanism including a drum that can roll along the sheet of material and that includes a plurality of forming members that can extend into and out of the drum and that have outer forming surfaces,
the at least one pocket forming mechanism further including a plurality of actuators and a controller that is configured to activate at least two different combinations of the plurality of forming members to form a pre-set pattern of the plurality of pockets in the sheet of material,
wherein the forming members are independently actuatable with respect to one another and are moveable towards and away from the sheet of material under the influence of the actuators controlled by the controller to deform the sheet of material according to the pre-set pattern and form rows of the plurality of pockets;
a filling station including a quantity of pills and configured to insert the pills into the pockets formed in the sheet of material by the at least one pocket forming mechanism; and
a covering station where a covering is applied onto the sheet of material to trap the pills in the pockets.

* * * * *

UNITED STATES PATENT AND TRADEMARK OFFICE
CERTIFICATE OF CORRECTION

| | | |
|---|---|---|
| PATENT NO. | : 11,779,518 B2 | Page 1 of 1 |
| APPLICATION NO. | : 17/396833 | |
| DATED | : October 10, 2023 | |
| INVENTOR(S) | : Michael L. Davis et al. | |

It is certified that error appears in the above-identified patent and that said Letters Patent is hereby corrected as shown below:

In the Claims

In Column 24, Line 20, Claim 13, delete "claim 8" and replace with -- claim 11 --

Signed and Sealed this
Twenty-third Day of April, 2024

Katherine Kelly Vidal
*Director of the United States Patent and Trademark Office*